United States Patent
Sato et al.

(10) Patent No.: US 10,384,344 B2
(45) Date of Patent: Aug. 20, 2019

(54) PROCESSING DEVICE, PARAMETER ADJUSTING METHOD, AND STORAGE MEDIUM

(71) Applicant: OMRON Corporation, Kyoto (JP)

(72) Inventors: Fumiaki Sato, Kyoto (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 47 days.

(21) Appl. No.: 15/871,096

(22) Filed: Jan. 15, 2018

(65) Prior Publication Data

US 2018/0264647 A1   Sep. 20, 2018

(30) Foreign Application Priority Data

Mar. 14, 2017 (JP) ................................. 2017-048013

(51) Int. Cl.
| | |
|---|---|
| *B25J 9/16* | (2006.01) |
| *G05B 19/23* | (2006.01) |
| *G05B 19/4062* | (2006.01) |
| *G05B 19/404* | (2006.01) |
| *G05B 13/04* | (2006.01) |

(52) U.S. Cl.
CPC .......... *B25J 9/1653* (2013.01); *B25J 9/1633* (2013.01); *B25J 9/1664* (2013.01); *G05B 13/042* (2013.01); *G05B 19/231* (2013.01); *G05B 19/404* (2013.01); *G05B 19/4062* (2013.01);

(Continued)

(58) Field of Classification Search
None
See application file for complete search history.

(56) References Cited

U.S. PATENT DOCUMENTS 4,546,426 A * 10/1985 Hafner .................... G05D 3/18
                                                    318/561
4,833,798 A *  5/1989 Ehrich .................... E02F 3/42
                                                    137/596.15

(Continued)

FOREIGN PATENT DOCUMENTS

| EP | 0436209 | 7/1991 |
|---|---|---|
| JP | 2006015431 | 1/2006 |
| JP | 5340486 | 11/2013 |

OTHER PUBLICATIONS

"Search Report of European Counterpart Application," dated Aug. 2, 2018, p. 1-p. 9.

*Primary Examiner* — Ramesh B Patel

(74) *Attorney, Agent, or Firm* — JCIPRNET

(57) ABSTRACT

A processing device is provided and electrically connected to a drive controller for driving a control object. The drive controller has a predetermined control structure that includes a feedback system and a control model part, and that enables model follow-up control according to the control models, and has the predetermined control structures corresponding to the control objects, respectively. The processing device determines a common control gain to set a predetermined control gain in the control model part of each predetermined control structure corresponding to the control objects to the common control gain for all the control model parts when synchronous control of the control objects is performed, and instructs the drive controller to set the common control gain for the control model part corresponding to each predetermined control structure.

12 Claims, 5 Drawing Sheets

(52) U.S. Cl.
CPC ............. *G05B 2219/34015* (2013.01); *G05B 2219/42336* (2013.01); *G05B 2219/42342* (2013.01)

(56) References Cited

U.S. PATENT DOCUMENTS

| | | | | |
|---|---|---|---|---|
| 6,021,418 | A * | 2/2000 | Brandt | G06F 9/451 |
| | | | | 715/205 |
| 8,819,952 | B2 * | 9/2014 | Naoi | G01B 5/0009 |
| | | | | 33/533 |
| 9,098,077 | B2 * | 8/2015 | Nagaoka | G05B 19/19 |
| 2002/0156541 | A1 * | 10/2002 | Yutkowitz | G05B 11/28 |
| | | | | 700/28 |
| 2012/0116545 | A1 * | 5/2012 | Yasui | G05B 13/042 |
| | | | | 700/30 |
| 2013/0008042 | A1 * | 1/2013 | Naoi | G01B 5/0009 |
| | | | | 33/533 |
| 2013/0138236 | A1 * | 5/2013 | Nagaoka | G05B 19/19 |
| | | | | 700/108 |
| 2017/0262573 | A1 * | 9/2017 | Mori | G06F 17/14 |
| 2017/0264231 | A1 * | 9/2017 | Kawanishi | G01R 31/44 |

\* cited by examiner

PROCESSING DEVICE, PARAMETER ADJUSTING METHOD, AND STORAGE MEDIUM

CROSS-REFERENCE TO RELATED APPLICATION

This application claims the priority benefit of Japanese application serial no. 2017-048013, filed on Mar. 14, 2017. The entirety of the above-mentioned patent application is hereby incorporated by reference herein and made a part of this specification.

BACKGROUND

Technical Field

The disclosure relates to a processing device or the like that is electrically connected to a drive controller for driving a control object and performs a process of determining control parameters for drive control.

Description of Related Art

In general, feedback control is used to move a control object to follow a target trajectory. For example, in an articulated robot, a servomotor of each joint axis is controlled by a controller of the robot to cause a position of a finger part of the robot to follow a previously set (instructed) target trajectory using feedback control. However, in common feedback control, since a delay in response invariably occurs at each servomotor, there is a problem that an actual trajectory of the robot deviates from the target trajectory. With respect to this problem, techniques for adopting feed forward control and controlling a position of a robot to always match a command position have been presented. For example, in a technique disclosed in Japanese Laid Open No. 2006-15431 (Patent Document 1), in control of an articulated robot arm driven by a plurality of motors, a future position is estimated from a current position using a predetermined position model, and a current position command is corrected by a difference between the estimated position and a target trajectory, namely by an error fraction of a direction perpendicular to the target trajectory, and thereby followability of the target trajectory is improved.

When the future position is estimated using the position model as described above and there is a big change in a trajectory characteristic of an actual control object, for instance, a switch from rectilinear movement to arc movement, accuracy of the estimation is not always favorable, and suitable correction of the position command becomes difficult. Therefore, in a technique disclosed in Japanese Patent No. 5340486 (Patent Document 2), a position command is corrected using information about a boundary point position of a shape of a target trajectory (a command path) and about a moving direction near the boundary point position, and thereby trajectory followability corresponding to a change in a trajectory characteristic is improved. A technique relevant to so-called model follow-up control may also be used in order to enhance servo control performance of a control object. In this model follow-up control technique, a model part that models a feedback system including a control object and a controller is formed in a control device and an output from the model part is reflected in the feedback system, and thereby the servo control performance is improved.

However, although the trajectory followability can be enhanced using the model follow-up control as in the related art, in the case of synchronous control in which a plurality of control shafts are synchronized and subjected to drive control, if followability of each control shaft differs, the trajectory caused by the synchronous control, namely the actual trajectory in which output of each control shaft subjected to the synchronous control is synthesized and formed, is likely to deviate from the target trajectory. For example, in the case where the control shafts are two orthogonal shafts, although the target trajectory of the synchronous control is a circular trajectory, when followability between the control shafts deviates, the actual trajectory is likely to become an elliptical trajectory as a result.

The disclosure was made to provide a technique in which, when a plurality of control objects are subjected to synchronous control according to so-called model follow-up control, an actual trajectory according to the synchronous control is made to follow a target trajectory as much as possible.

In the disclosure, when a plurality of control objects are synchronously controlled, responsiveness at control model parts for model follow-up control corresponding to the control objects is formed to be the same. With this configuration, an actual trajectory according to the synchronous control can be made to suitably follow a target trajectory.

SUMMARY

In one embodiment, the disclosure is a processing device that is electrically connected to a drive controller for driving a control object. Here, the drive controller includes: a predetermined control structure that includes a feedback system having one or a plurality of controllers to which a feedback signal relevant to a motion of the control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure. Further, the drive controller performs the drive control on a plurality of the control objects and has a plurality of predetermined the control structures corresponding to the control objects respectively. The processing device includes a determination part of determining a common control gain to set a predetermined control gain in the control model part of each of the plurality of predetermined control structures corresponding to the plurality of control objects to the common control gain for all the control model parts when synchronous control of the plurality of the control objects is performed; and a setting instruction part configured to instruct the drive controller to set the predetermined control gain in the control model part corresponding to each of the plurality of predetermined control structures to the common control gain.

In another embodiment, a parameter adjusting method is provided for adjusting control parameters of a drive controller. The parameter adjusting method is a parameter adjusting method for adjusting control parameters of a drive controller, in which the drive controller includes a predetermined control structure that includes a feedback system having one or a plurality of controllers to which a feedback signal relevant to a motion of a control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure. The drive controller is configured to perform the drive control on a plurality of the control objects and to have a plurality of the predetermined control structures corresponding to the control objects respectively. The parameter adjusting method includes a determining process of determining a common control gain to set a predetermined control gain in the control model part of each of the plurality of predetermined control structures corresponding to the plurality of control objects to the common control gain for all the control model parts when synchronous control of the plurality of the control objects is performed. The parameter adjusting method includes instructing the drive controller to set the predetermined control gain in the control model part corresponding to each of the plurality of the predetermined control structures to the common control gain.

In another embodiment, a non-statutory storage medium storing a parameter adjusting program is provided for enabling a processing device that is electrically connected to a drive controller to execute a predetermined parameter adjusting process. To be specific, the parameter adjusting program enables the processing device to execute the following flow of processes. The processing device is electrically connected to a drive controller, in which the drive controller includes: a predetermined control structure that includes a feedback system having one or a plurality of controllers to which a feedback signal relevant to a motion of a control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure. The drive controller is configured to perform the drive control on a plurality of control objects and to have a plurality of predetermined control structures corresponding to the control objects respectively. That is, the parameter adjusting program enables the processing device to execute a process of performing a determining process of determining a common control gain to set a predetermined control gain in the control model part of each of the plurality of predetermined control structures corresponding to the plurality of control objects to the common control gain for all the control model parts when synchronous control of the plurality of the control objects is performed; and a process of instructing the drive controller to set the predetermined control gain in the control model part corresponding to each of the plurality of predetermined control structures to the common control gain. As described above, with regard to the technical spirit disclosed for the processing device, as long as there is no technical contradiction, the processing device can be also applied to the disclosure of the parameter adjusting program.

DESCRIPTION OF THE EMBODIMENTS

<First Embodiment>

Figure 1:
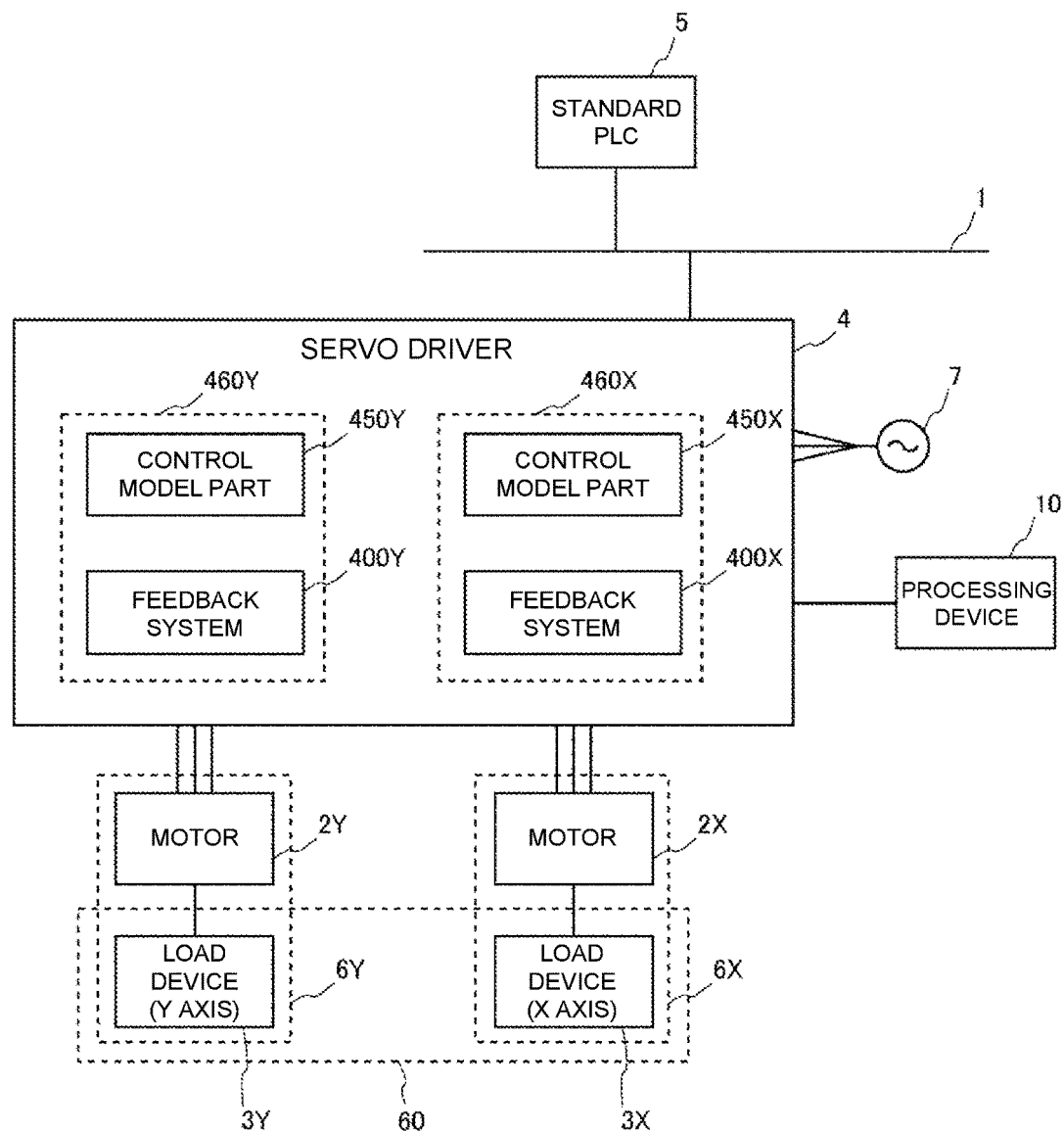
FIG. 1 is a diagram illustrating a schematic configuration of a control system to which a processing device according to the disclosure is applied.
Figure 2:
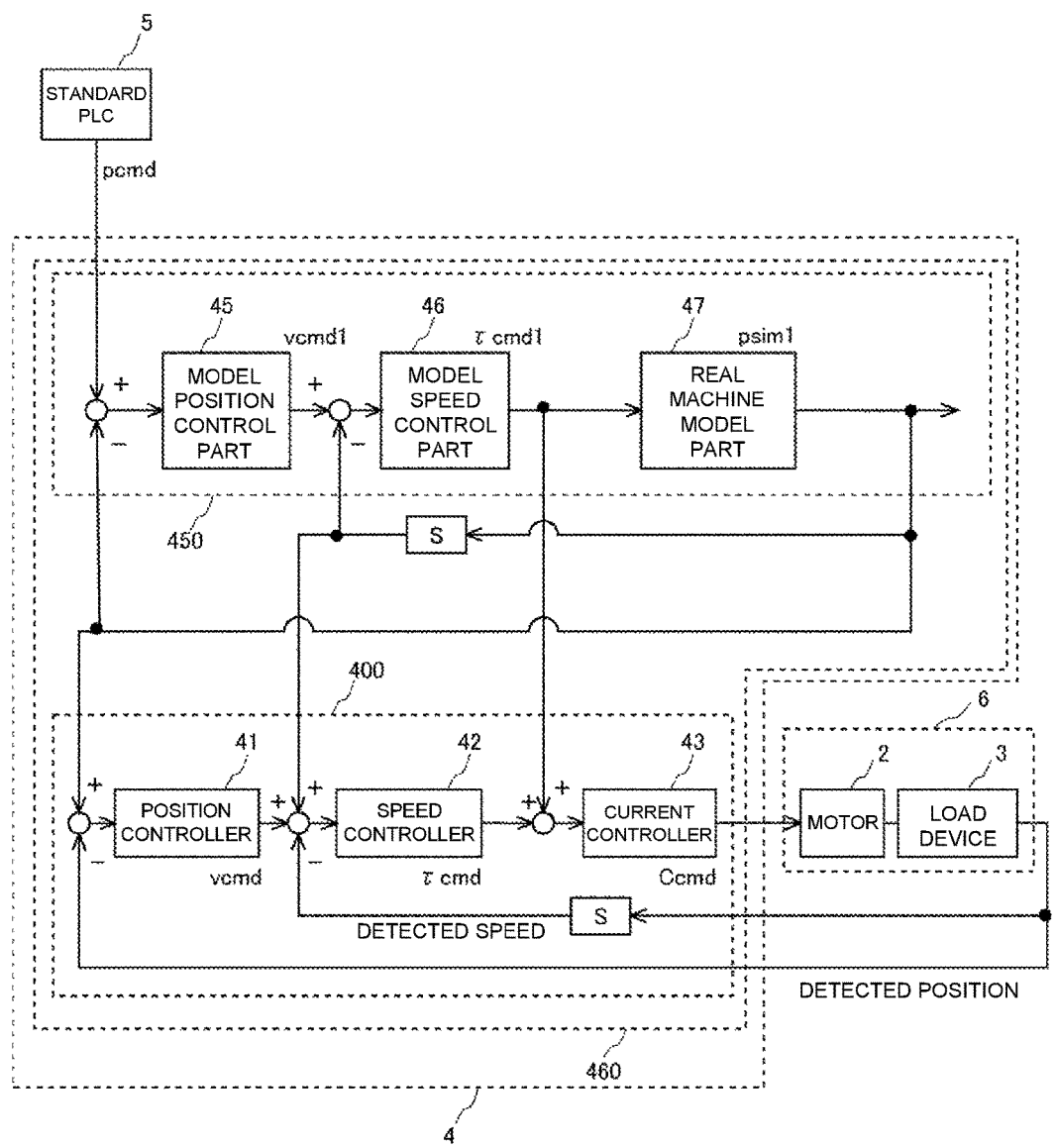
FIG. 2 is a diagram illustrating a servocontrol structure formed in a servo driver included in the control system illustrated in FIG. 1.

FIG. 1 is a diagram illustrating a schematic configuration of a control system to which a processing device 10 according to an embodiment of the disclosure is applied. In FIG. 2, the control system includes a network 1, a servo driver 4, and a standard programmable logic controller (PLC) 5. The control system is a system for the servo driver 4 performing drive control on a control object 6 to enable the control object 6 to follow an motion command signal pcmd generated by the standard PLC 5. The control system illustrated in FIG. 1 is configured such that motors 2X and 2Y corresponding to X and Y axes that are two control axes are connected to the servo driver 4, and synchronous control of both of the motors is possible. In this specification, when configurations corresponding to the control axes are represented by distinguishing the control axes, letters "X" and "Y" indicating the control axes are adopted and affixed to reference signs of the configurations, and when the configurations are represented without distinguishing the control axes, the affixture of the letters indicating the control axes is omitted. Configurations of a load device 3, a feedback system 400, a control model part 450, and a servocontrol structure 460, all of which will be described below, in addition to the motor 2 and the control object 6 follow this representation rule.

Here, systems of the two control axes of the control object 6X, which includes the load device 3X and the motor 2X of the X axis, and the control object 6Y, which includes the load device 3Y and the motor 2Y of the Y axis, are subjected to control drive by the servo driver 4. A device 60, on which the synchronous control of the control object 6 on both of the control axes is performed, can be configured by the load device 3X of the X axis and the load device 3Y of the Y axis. An example of the device 60 includes, for example, an XY table of a machine tool or a conveyance device, etc., or an arm, etc. of an industrial robot having a plurality of joint axes. The motor 2 is incorporated in the load device 3 as an actuator for driving the load device 3. For example, the motor 2 is an AC servomotor. An encoder (not shown) is mounted on the motor 2, and a parameter signal relevant to a motion of the motor 2 is fed back to the servo driver 4 by the encoder. The fed back parameter signal (hereinafter referred to as a feedback signal) includes, for example, position information about a rotational position (angle) of a rotary shaft of the motor 2, information about a rotating speed of the rotary shaft, or the like.

The standard PLC 5 generates a motion command signal relevant to the motion of the motor 2, and transmits the motion command signal to the servo driver 4. A motion command signal when the two control axes are synchronously controlled is referred to below as a synchronous motion command signal. The servo driver 4 receives the motion command signal pcmd (see FIG. 2) from the standard PLC 5 via the network 1, and the feedback signal output from the encoder connected to the motor 2. The servo driver 4 calculates a command value that relates to servocontrol relevant to driving of the motor 2, namely the motion of the motor 2, based on the motion command signal pcmd from the standard PLC 5 and the feedback signal from the encoder, and supplies a drive current to the motor 2 such that the motion of the motor 2 follows the command value. For the supplied current, AC power sent from an AC source 7 to the servo driver 4 is used. In the present embodiment, the servo driver 4 is a type that receives a three-phase AC, but the servo driver 4 may also be a type that receives a single-phase AC. The servocontrol performed by the servo driver 4 is feedback control using a servocontrol structure 460 including a feedback system 400 and a control model part 450, and details thereof will be described below based on FIG. 2. The servocontrol structures 460 are prepared for the control axes respectively. Specifically, a servocontrol structure 460X for the drive control of the X axis and a servocontrol structure 460Y for the drive control of the Y axis are formed. A feedback system 400X and a control model part 450X are included in the servocontrol structure 460X, and a feedback system 400Y and a control model part 450Y are included in the servocontrol structure 460Y.

The processing device 10 is electrically connected to the servo driver 4. The electrical connection may be wired connection or wireless connection. The processing device 10 is for setting and adjusting control parameters for the servocontrol of the servo driver 4, and an adjusting program is included therein. To be specific, the processing device 10 is a computer having an arithmetic unit and a memory, and so has an executable adjusting program. This adjusting program calculates, adjusts, and determines necessary control parameters depending on the purpose of the servocontrol performed by the servo driver 4. For example, a standard calculating process of calculating, adjusting, and determining control parameters suitable for mechanical properties, physical properties, etc. of the control object is performed on each of the control objects by the adjusting program. In the standard calculating process, the control parameter may be calculated, adjusted, and determined while the control object 6 is actually moved, or the control parameter may be calculated, adjusted, and determined by simulating a motion of the control object 6 using a physical model corresponding to the control object 6 without actually moving the control object 6. In this standard calculating process, the control parameter is determined only for one control object in consideration of responsiveness of the one control object, and the control parameter corresponding to the one control object is not determined in consideration of a correlation between the one control object and the other control object. Therefore, according to the standard calculating process, the control parameter corresponding to the servocontrol structure 460X is calculated and determined such that the responsiveness or the like of the control object 6X of the X axis reaches a target state through a certain process, or the control parameter corresponding to the servocontrol structure 460Y is calculated and determined such that the responsiveness or the like of the control object 6Y of the Y axis reaches a target state through another process. According to the adjusting program, the parameter adjusting process illustrated in FIG. 4 (to be described below) is also performed.

Here, the servocontrol structure 460 formed in the servo driver 4 will be described based on FIG. 2. As described above, the servocontrol structures 460X and 460Y corresponding to the respective control axes are formed in the servo driver 4. However, both of the servocontrol structures have substantially the same basic structure in which values of the control parameters to be used are set to values corresponding to the respective control objects 6, and the representative basic structure of the servocontrol structure 460 is illustrated in FIG. 2.

The servocontrol structure 460 is configured so as to make it possible to perform so-called model follow-up control in the servo driver 4, and includes the feedback system 400 and the control model part 450. The feedback system 400 includes a position controller 41, a speed controller 42, and a current controller 43. Meanwhile, the control model part 450 includes a model position control part 45, a model speed control part 46, and a real machine model part 47 that are configurations modeling these controllers and the control objects 6.

First, details of the feedback system 400 will be described. In the feedback system 400, the position controller 41 performs, for instance, proportional control (P control). To be specific, a speed command vcmd is calculated by multiplying a position deviation, which is a deviation between a model position output psim1 of the control model part 450 and a detected position, by a predetermined position proportional gain.

The speed controller 42 performs proportional-integral control (PI control). To be specific, an integral quantity of a speed deviation between a detected speed and the sum of the speed command vcmd calculated by the position controller 41 and speed output (a differential value of the model position output psim1) of the control model part 450 is multiplied by a predetermined speed integral gain, and the sum of a result of the calculation and the speed deviation is multiplied by a predetermined speed proportional gain, and thereby a torque command τcmd is calculated. The speed controller 42 may perform the P control instead of the PI control.

The current controller 43 outputs a current command Ccmd based on the sum of a torque command τcmd calculated by the speed controller 42 and a model torque command τcmd1 calculated by the model speed control part 46 of the control model part 450, and thereby the motor 2 is subjected to the drive control. The current controller 43 includes a filter (a primary low-pass filter) or one or a plurality of notch filters that are relevant to the torque command, and has cutoff frequencies or the like relevant to performance of these filters as the control parameters.

Next, the control model part 450 will be described. In the control model part 450, the model position control part 45 is realized by modeling the position controller 41 of the feedback system 400, and performs the P control like the position controller 41.

To be specific, a deviation between the motion command signal pcmd from the standard PLC 5 and the model position output psim1 of the control model part 450 is multiplied by a predetermined position proportional gain, and thereby a model speed command vcmd1 is calculated.

The model speed control part 46 is realized by modeling the speed controller 42 of the feedback system 400, and performs the PI control like the speed controller 42. To be specific, an integral quantity of a deviation between the model speed command vcmd1 calculated by the model position control part 45 and the speed output (the differential value of the model position output psim1) of the control model part 450 is multiplied by a predetermined speed integral gain, and the sum of a result of the calculation and the speed deviation is multiplied by a predetermined speed proportional gain, and thereby a model torque command τcmd1 is calculated.

The real machine model part 47 is realized by modeling the current controller 43 of the feedback system 400 and the control object 6, and outputs the model position output psim1 based on the model torque command τcmd1 calculated by the model speed control part 46.

The control parameters in the servocontrol structure 460 including the feedback system 400 and the control model part 450 configured in this way are calculated and determined for each control object by the standard calculating process. In the servocontrol structure 460, a so-called model follow-up control structure is formed, in which the control drive of the control object 6 is simulated by the control model part 450 having a control structure to which the feedback system 400 and the control object 6 are modeled, and a result thereof is reflected on the feedback system 400. In the servocontrol structure 460 having this model follow-up control structure, since a feedback loop of the feedback system 400 is configured to use the deviation from the output of the control model part 450 rather than the deviation from the motion command signal pcmd, followability for properties of the control model part 450 increases.

The servocontrol structure 460 having this characteristic is formed inside the servo driver 4 corresponding to the control axes X and Y. Here, when the synchronous control of the control objects 6X and 6Y is performed using the servocontrol structure 460 for which the control parameters calculated and determined by the standard calculating process are set with no change, an actual output trajectory of the device 60 according to the synchronous control tends to deviate from an ideal output trajectory of the device 60 according to the synchronous motion command signal from the standard PLC 5 (see FIG. 5 which will be described below). This is because the control parameters set in the standard calculating process are the parameters only corresponding to each of the control objects 6 and are not set in consideration of the synchronous control, and thus the followabilities with respect to the synchronous motion command signals of the servocontrol structures 460 respectively corresponding to the control objects 6 are different from each other.

Figure 3:
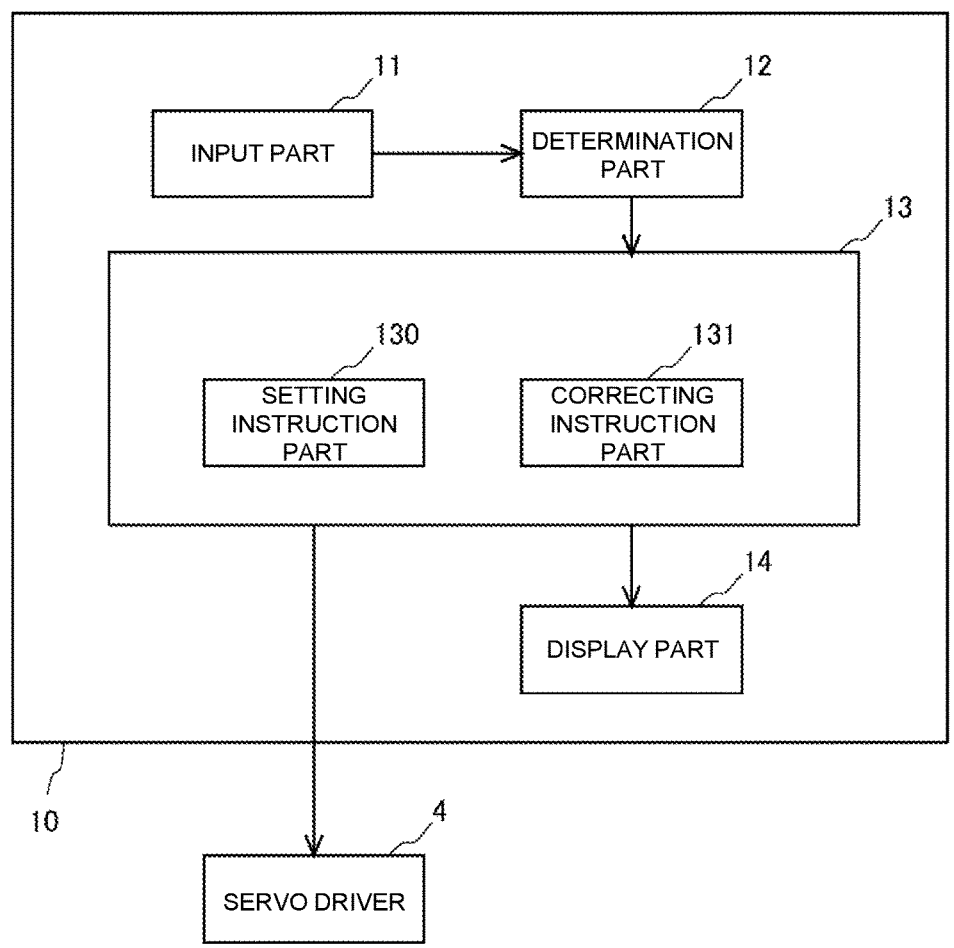
FIG. 3 is a functional block diagram of the processing device according to the disclosure.

Therefore, when the synchronous control is performed by the plurality of control objects 6, the calculating and determining processes of the control parameters are performed by the processing device 10 in order to eliminate the influence in followability between the servocontrol structures 460. To perform the calculating and determining processes of the control parameters for the synchronous control, the processing device 10 is configured to have functional parts illustrated in FIG. 3. FIG. 3 is a functional block diagram illustrated by visualizing various functions executed by the adjusting program executed in the processing device 10. The processing device 10 has an input part 11, a determination part 12, an instruction part 13, and a display part 14.

The input part 11 is a functional part that receives the input of a notice announcing that the synchronous control of the control objects 6X and 6Y is performed by the servo driver 4. To be specific, the input part 11 may be made up of a keyboard or a mouse. The input part 11 is made up of a touch panel that is common hardware along with the display part 14 (to be described below), and the input of the notice relevant to performing of the synchronous control is performed by an operation of a user. Next, the determination part 12 is a functional part that performs a determining process of determining a common control gain between the two control model parts 450X and 450Y, which is set to a predetermined control gain included in the control model parts 450 of both of the servocontrol structures 460 when the synchronous control of the control objects 6X and 6Y is performed, for instance a control gain in the model position control parts 45 and a control gain in the model speed control parts 46. This common control gain is a control gain common for the model position control part 45 between the control model parts 450X and 450Y, and a control gain common for the model speed control parts 46 between the control model parts 450X and 450Y. The determining process performed by this determination part 12 will be described below based on FIG. 4.

Next, the instruction part 13 is a functional part that instructs the servo driver 4 and the display part 14 to reflect a predetermined content on the servo driver 4 and the display part 14. To be specific, the instruction part 13 has a setting instruction part 130 and a correcting instruction part 131. The setting instruction part 130 offers a setting instruction to the servo driver 4 such that the common control gain determined by the determination part 12 is set for the corresponding control model part 450. The correcting instruction part 131 instructs the servo driver 4 to correct the synchronous motion command signal based on the deviation (the difference) between the actual output trajectory of the device 60 and the ideal output trajectory of the device 60. The actual output trajectory is a result of the synchronous control of the control objects 6X and 6Y that is performed using the servocontrol structure 460 for which the common control gain is set according to the instruction of the setting instruction part 130, and the ideal output trajectory is based on the synchronous motion command signal from the standard PLC 5. In addition, the correcting instruction part 131 gives an instruction for displaying how to perform correction on the display part 14 such that a content of the correction can be grasped by a user. The display part 14 is a functional part that performs display relevant to the instruction content from the correcting instruction part 131. The display part 14 is not an essential configuration of the processing device 10, and may be provided outside the processing device 10. As described above, the display part 14 may be configured as a touch panel including the function of the input part 11.

Figure 4:
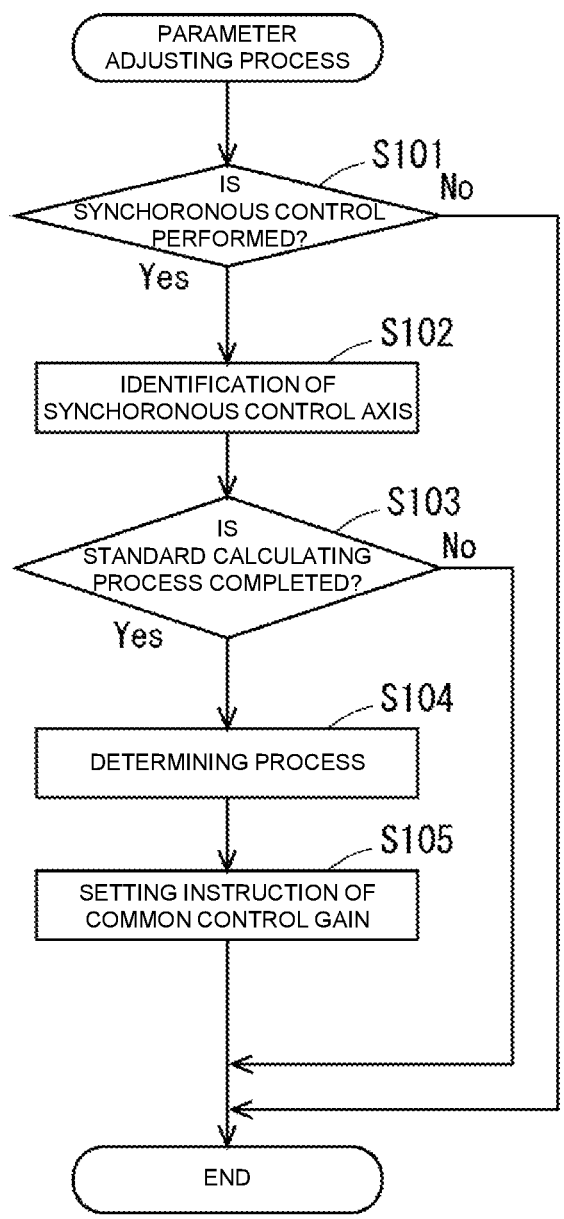
FIG. 4 is a flow chart illustrating a flow of a parameter adjusting process performed by the processing device.

Here, details of the parameter adjusting process performed by the determination part 12 and the instruction part 13, particularly the setting instruction part 130, will be described based on FIG. 4. The parameter adjusting process is different from the standard calculating process, and is performed in consideration of the synchronous control of the control objects 6X and 6Y. The parameter adjusting process calculates and determines the control parameter of the servocontrol structure 460, particularly the control gain in the control model part 450, and is repeatedly performed at predetermined time intervals.

First, it is determined in S101 whether the synchronous control is performed. If the input of the notice relating to performing of the synchronous control of the control objects 6X and 6Y is performed by the input part 11, the result in S101 is determined to be positive and the parameter adjusting process proceeds to S102, and is otherwise determined to be negative and the parameter adjusting process is terminated. Next, in S102, based on the synchronous control is performed, synchronous control axes subjected to the synchronous control are identified. In the example illustrated in FIG. 1, since only the control objects 6X and 6Y are connected to the servo driver 4, the synchronous control axes are the control objects 6X and 6Y. If three or more control objects are connected to the servo driver 4, an inquiry is made to the standard PLC 5 from the processing device 10 via the servo driver 4 about the control objects subjected to the synchronous control, and the synchronous control axes are identified based on a reply from the standard PLC 5. The inquiry about the control objects subjected to the synchronous control may be made to a user. In that case, a content of the inquiry is displayed on the display part 14, and a reply from the user via the input part 11, namely identification of the control objects subjected to the synchronous control, is obtained. When the process of S102 is terminated, the result proceeds to S103.

In S103, it is determined whether or not the above standard calculating process is completed in the servo driver 4. That is, it is determined whether or not the calculation and determination of the control parameter of the servocontrol structure 460 in consideration of predetermined properties for each of the control objects 6 are completed. When the result in S103 is determined to be positive, the parameter adjusting process proceeds to S104. When the result in S103 is determined to be negative, the parameter adjusting process is terminated.

In S104, a determining process due to the determination part 12 is performed. To be specific, when the control gain of the control model part 450X set for the control object 6X and the control gain of the control model part 450Y set for the control object 6Y are compared by the standard calculating process, the control gain having a lowest value is determined as the common control gain. Thereby, responsivenesses in model calculations in the control model parts 450 during the synchronous control are made to be the same degree, and the servocontrol of the servocontrol structure 460 can be stabilized. In the present embodiment, assuming that the control gain on the side of the control model part 450X is relatively low, the control gain of the control model part 450X (the control gains inside the model position control part 45 and the model speed control part 46 of the control model part 450X) is determined as the common control gain. When S104 is terminated, the parameter adjusting process proceeds to S105.

In S105, an instruction to the servo driver 4 is performed by the setting instruction part 130 such that the common control gain determined in S104 is set for the control model parts 450X and 450Y of the control objects 6X and 6Y of the servo driver 4. As a result, the servo driver 4 sets the common control gain in the control model parts 450X and 450Y according to the setting instruction. Since the common control gain is the control gain on the side of the control object 6X as described above, the control gain in the control model part 450Y of the control object 6Y is adapted to be changed into the common control gain without substantially changing the control gain in the control model part 450X of the control object 6X.

Figure 5:
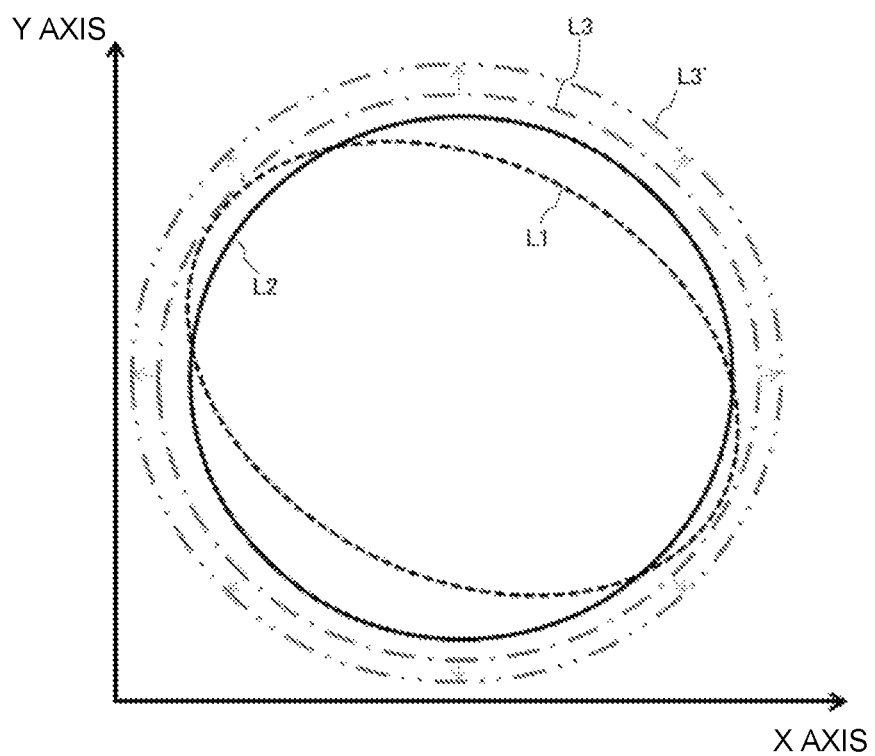
FIG. 5 is a graph illustrating a result (a trajectory of synchronous control) when two control objects are subjected to synchronous control according to a common control gain set for a servo driver as a result of the parameter adjusting process illustrated in FIG. 4.

Here, the output trajectory of the device 60 during the synchronous control when the common control gain is set by the parameter adjusting process of FIG. 4 will be described based on FIG. 5. In the present embodiment, the synchronous control of the control objects 6X and 6Y is performed such that the ideal output trajectory of the device 60 becomes a circular trajectory. Here, a broken line L1 illustrated in FIG. 5 indicates the output trajectory of the device 60 in a state that the common control gain determined by the determination part 12 is not set in common between the control model parts 450 (i.e., in a state that the control gain determined in the standard calculating process is directly set for each of the control model parts 450). In this case, it is found that, due to the difference in followability between the control model parts 450, the output trajectory of the device 60 becomes an elliptical shape. A solid line L2 illustrated in FIG. 5 indicates the actual output trajectory of the device 60 in a state that the common control gain determined by the determination part 12 is set in common between the control model parts 450. In this way, since the followabilities between the control objects 6X and 6Y are made to be the same degree by the setting of the common control gain, the output trajectory of the device 60 becomes very close to the circular trajectory. The ideal output trajectory when the output trajectory of the device 60 indicated by this solid line L2 is obtained is indicated by a dot-and-dash line L3.

MODIFICATION EXAMPLE 1

Here, by setting the common control gain for each of the control model parts 450, distortion of the output trajectory of the device 60 which results from the difference in followability between the control model parts 450 can be eliminated. However, even if the common control gain has been set, the actual output trajectory may still deviate from the ideal output trajectory. This is because the servocontrol structure 460 capable of the model follow-up control is adopted in the servo driver 4, and the control model part 450 has a low-pass filter characteristic. Especially, since the lowest gain between the control model parts 450 is determined as the common control gain in S104, the deviation from the ideal output trajectory remains easily.

Therefore, in one way, the synchronous motion command signal is corrected such that the actual output trajectory indicated by the solid line L2 is matched with the ideal output trajectory indicated by the dot-and-dash line L3. To be specific, the synchronous motion command signal is corrected based on a difference between the actual output trajectory indicated by the solid line L2 and the ideal output trajectory indicated by the dot-and-dash line L3 such that the actual output trajectory is amplified by cancelling the low-pass filter characteristic of the control model part 450. As a result, the output trajectory of the device 60 based on the corrected synchronous motion command signal becomes an output trajectory indicated by a two-dot chain line L3'. In this correction of the synchronous motion command signal, a correcting instruction is provided from the processing device 10 to the servo driver 4 by the correcting instruction part 131. The servo driver 4 receiving the correcting instruction performs a correcting process according to the correcting instruction on the synchronous motion command signal received from the standard PLC 5, and inputs the corrected synchronous motion command signal to the servocontrol structure 460. Thereby, the actual output trajectory can be very close to the ideal output trajectory indicated by the dot-and-dash line L3.

To display the corrected content to a user, the correcting instruction part 131 may provide an instruction to display the corrected content to the display part 14. For example, the actual output trajectory indicated by the solid line L2 and the ideal output trajectory indicated by the dot-and-dash line L3 are shown, and the output trajectory indicated by the two-dot chain line L3' indicating the corrected content based on the difference between both of the trajectories is displayed on the display part 14. The actual output trajectory displayed on the display part 14 may be an output trajectory obtained by response simulation of the servocontrol structure 460 on which the common control gain is reflected in the processing device 10.

MODIFICATION EXAMPLE 2

Instead of the modes as described above, the functions of the input part 11, the determination part 12, the instruction part 13, and the display part 14 in the processing device 10 may be formed in the standard PLC 5 or the servo driver 4. In this case, the standard PLC or the servo driver 4 performs the parameter adjusting process illustrated in FIG. 4. As a result, the common control gain is set for the respective control model parts 450X and 450Y of the control objects 6X and 6Y of the servo driver 4. To be more specific, as described above, the device 60 can be the XY table of the machine tool or the conveyance device, etc., or the arm, etc. of the industrial robot having plural joint axes, for example. However, each function of the processing device 10 is formed in a numerical value controller of the machine tool (which is a configuration equivalent to the standard PLC 5) in the former case, or a controller of the robot (which is a configuration equivalent to the standard PLC 5) in the latter case.

In detail, the disclosure is a processing device that is electrically connected to a drive controller for driving a control object. Here, the drive controller includes: a predetermined control structure that includes a feedback system having one or a plurality of controllers to which a feedback signal relevant to a motion of the control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure. Further, the drive controller performs the drive control on a plurality of the control objects and has a plurality of predetermined the control structures corresponding to the control objects respectively. The processing device includes: a determination part of determining a common control gain to set a predetermined control gain in the control model part of each of the plurality of predetermined control structures corresponding to the plurality of control objects to the common control gain for all the control model parts when synchronous control of the plurality of the control objects is performed; and a setting instruction part configured to instruct the drive controller to set the predetermined control gain in the control model part corresponding to each of the plurality of predetermined control structures to the common control gain.

The processing device of the disclosure is electrically connected to the drive controller, and thereby can access information which the drive controller has and provide predetermined information for the drive controller. This electrical connection may be wired connection or wireless connection. In the drive controller, the process of calculating the predetermined signal for the drive control of the control objects is performed by the calculating part based on the predetermined control structure including the feedback system and the control model part. Thereby, in the drive controller, so-called model follow-up control using model calculation according to the control model which the control model part has is realized. The drive controller can perform the drive control on the plurality of the control objects according to the model follow-up control respectively. To this end, the drive controller has a servocontrol structure for the model follow-up control corresponding to each of the control objects.

In the processing device, based on the drive controller configured in this way, an instruction relevant to parameter setting for the model follow-up control of the drive controller is output to the drive controller by the setting instruction part. Here, as described above, when the synchronous control is performed on the plurality of the control objects, if followability of the control objects is different, there is a possibility of an actual trajectory according to the synchronous control deviating from a target trajectory. Therefore, in the processing device, the determining process is performed by the determination part, and making the predetermined control gains common, for instance, a position proportional gain, a speed proportional gain, a speed integral gain, etc., in the control model parts should be achieved between the control model parts such that the degrees of responsiveness at the time of the model calculation in the control model parts of the predetermined control structures corresponding to the control objects become substantially the same.

In this determining process, the common control gain applied to the predetermined control gains of the control model parts corresponding to the plurality of control objects is determined so as to make the predetermined control gains common. In the case of a plurality of predetermined control gains, for instance, when a position proportional gain, a speed proportional gain, and a speed integral gain are the predetermined gains, a plurality of gains are also equally adapted to be determined by the determination part as the common control gain. The common control gain determined by the determination part is intended to make the predetermined control gains in the control model parts corresponding to the control objects common, and is not necessarily relevant to a control gain in the feedback system corresponding to each of the control objects. The gain in the feedback system may be determined independently of the determining process of the determination part in light of mechanical and physical properties of the control objects.

With regard to the common control gain determined by determination part, the setting instruction is provided to the drive controller by the setting instruction part. As a result, the common control gain in the control model parts corresponding to the control objects is set in the drive controller. Thereby, the degrees of responsiveness at the time of the model calculation in the control model parts corresponding to the control objects become the same. As a result, followability deviation between the control objects when the plurality of control objects are subjected to the synchronous control is eliminated, and thus the actual trajectory according to the synchronous control can be made to follow the target trajectory as much as possible.

Here, the determination of the common control gain performed by the determination part may be performed according to various standards as long as the degree of responsiveness at the time of the model calculation in the control model parts is the same. As an example, in the processing device, before the determining process, a standard calculating process is performed to calculate a predetermined control parameter of each of the control objects in the predetermined control structures, each of which includes the predetermined control gain, independently from the other control object based on predetermined properties of the control object may be performed, and the determination part may determine a gain with a lowest value among the predetermined gains calculated in the standard calculating process for the plurality of the control objects as the common control gain.

The standard calculating process is a process of calculating the predetermined control parameter relevant to the feedback system or the control model part included in the predetermined control structure in consideration of predetermined properties of one of the control objects such as mechanical properties or physical properties without considering a correlation with the other control object. Accordingly, the predetermined control parameter calculated in the standard calculating process is set to the predetermined control structure so that a result of driving the one control object is favorable, and the parameter is not necessarily calculated to reflect a plurality of drive controls. As described above, the gain with the lowest value among predetermined gains calculated in the standard calculating process for the plurality of control objects is used as the common control gain. Thereby, making the predetermined control gains between the model parts common is achieved according to the control object having low responsiveness among the plurality of control objects, and stability of the synchronous control is also secured.

Here, the aforementioned processing device may further include a correcting instruction part configured to instruct the drive controller to correct a synchronous motion command signal, which is supplied from a host controller to the drive controller, based on a difference between an ideal output trajectory of the plurality of the control objects and an actual output trajectory. The ideal output trajectory is based on the synchronous motion command signal for the synchronous control of the plurality of the control objects and the actual output trajectory is a result of the synchronous control of the plurality of the control objects when the predetermined control gain in the control model part is set to the common control gain. By adopting the configuration of the disclosure as described above, the followability deviation between the control objects can be favorably eliminated. However, since the control model of the control model part for performing the model follow-up control tends to have a characteristic approximating a low-pass filter, there is a possibility of deviation occurring between the ideal output trajectory of the plurality of control objects based on the synchronous motion command signal and the actual output trajectory of the control objects. Therefore, the correcting instruction for the drive controller is provided by the correcting instruction part to correct the synchronous motion command signal in order to eliminate this deviation. An example of the correction may be correction in consideration of the low-pass filter approximation characteristic of the control model part.

The aforementioned processing device may be a host controller that generates the synchronous motion command signal. The processing device may be a device that performs the standard calculating process.

The disclosure can be understood from an aspect of a parameter adjusting method for adjusting control parameters of a drive controller. To be specific, the parameter adjusting method is a parameter adjusting method for adjusting control parameters of a drive controller, in which the drive controller includes: a predetermined control structure that includes a feedback system having one or a plurality of controllers to which a feedback signal relevant to a motion of a control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure. The drive controller is configured to perform the drive control on a plurality of the control objects and to have a plurality of the predetermined control structures corresponding to the control objects respectively. The parameter adjusting method includes a determining process of determining a common control gain to set a predetermined control gain in the control model part of each of the plurality of predetermined control structures corresponding to the plurality of control objects to the common control gain for all the control model parts when synchronous control of the plurality of the control objects is performed. The parameter adjusting method includes instructing the drive controller to set the predetermined control gain in the control model part corresponding to each of the plurality of the predetermined control structures to the common control gain.

The parameter adjusting method may include, before the determining process, performing a standard calculating process of calculating a predetermined control parameter of each of the control objects in the predetermined control structures, each of which includes the predetermined control gain, independently from the other control object based on predetermined properties of the control object, and determining a gain with a lowest value among predetermined gains calculated in the standard calculating process for the plurality of control objects as the common control gain in the determining process. As described above, with regard to the technical spirit disclosed for the processing device, as long as there is no technical contradiction, the processing device can also be applied to the disclosure of the parameter adjusting method.

The disclosure can be understood from an aspect of a parameter adjusting program for enabling a processing device that is electrically connected to a drive controller to execute a predetermined parameter adjusting process. To be specific, the parameter adjusting program enables the processing device to execute the following flow of processes. The processing device is electrically connected to a drive controller, in which the drive controller has: a predetermined control structure that includes a feedback system having one or a plurality of controllers to which a feedback signal relevant to a motion of a control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure. The drive controller is configured to perform the drive control on a plurality of control objects and to have a plurality of predetermined control structures corresponding to the control objects respectively. That is, the parameter adjusting program enables the processing device to execute a process of performing a determining process of determining a common control gain to set a predetermined control gain in the control model part of each of the plurality of predetermined control structures corresponding to the plurality of control objects to the common control gain for all the control model parts when synchronous control of the plurality of the control objects is performed; and a process of instructing the drive controller to set the predetermined control gain in the control model part corresponding to each of the plurality of predetermined control structures to the common control gain. As described above, with regard to the technical spirit disclosed for the processing device, as long as there is no technical contradiction, the processing device can be also applied to the disclosure of the parameter adjusting program.

When a plurality of control objects are subjected to synchronous control according to model follow-up control, an actual trajectory caused by the synchronous control can follow a target trajectory as much as possible.

What is claimed is:

1. A processing device that is electrically connected to a drive controller for driving a control object, wherein
the drive controller includes:
a predetermined control structure that includes a feedback system having one or a plurality of controllers to which a feedback signal relevant to a motion of the control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure, the drive controller performs the drive control on a plurality of the control objects and has a plurality of the predetermined control structures corresponding to the control objects respectively, and the processing device includes:
a determination part configured to perform a determining process of determining a common control gain to set a predetermined control gain in the control model part of each of the plurality of predetermined control structures corresponding to the plurality of control objects to the common control gain for all the control model parts when synchronous control of the plurality of the control objects is performed; and a setting instruction part configured to instruct the drive controller to set the predetermined control gain in the control model part corresponding to each of the plurality of the predetermined control structures to the common control gain.

2. The processing device according to claim 1, wherein:
before the determining process, a standard calculating process is performed to calculate a predetermined control parameter of each of the control objects in the predetermined control structures, each of which includes the predetermined control gain, independently from the other control object based on predetermined properties of the control object; and the determination part determines a gain with a lowest value among the predetermined gains calculated in the standard calculating process for the plurality of the control objects as the common control gain.

3. The processing device according to claim 1, further comprising a correcting instruction part configured to instruct the drive controller to correct a synchronous motion command signal, which is supplied from a host controller to the drive controller, based on a difference between an ideal output trajectory of the plurality of the control objects and an actual output trajectory, and the ideal output trajectory is based on the synchronous motion command signal for the synchronous control of the plurality of the control objects and the actual output trajectory is a result of the synchronous control of the plurality of the control objects when the predetermined control gain in the control model part is set to the common control gain.

4. The processing device according to claim 2, further comprising a correcting instruction part configured to instruct the drive controller to correct a synchronous motion command signal, which is supplied from a host controller to the drive controller, based on a difference between an ideal output trajectory of the plurality of the control objects and an actual output trajectory, and the ideal output trajectory is based on the synchronous motion command signal for the synchronous control of the plurality of the control objects and the actual output trajectory is a result of the synchronous control of the plurality of the control objects when the predetermined control gain in the control model part is set to the common control gain.

5. The processing device according to claim 1, wherein the processing device is a host controller that generates the synchronous motion command signal.

6. The processing device according to claim 2, wherein the processing device is a host controller that generates the synchronous motion command signal.

7. The processing device according to claim 3, wherein the processing device is the host controller that generates the synchronous motion command signal.

8. The processing device according to claim 4, wherein the processing device is the host controller that generates the synchronous motion command signal.

9. The processing device according to claim 2, wherein the processing device performs the standard calculating process.

10. A parameter adjusting method for adjusting control parameters of a drive controller, in which the drive controller includes:
a predetermined control structure that includes a feedback system having one or a plurality of controllers to which a feedback signal relevant to a motion of a control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure, and the drive controller is configured to perform the drive control on a plurality of the control objects and to have a plurality of the predetermined control structures corresponding to the control objects respectively, the parameter adjusting method comprising:
performing a determining process of determining a common control gain to set a predetermined control gain in the control model part of each of the plurality of predetermined control structures corresponding to the plurality of control objects to the common control gain for all the control model parts when synchronous control of the plurality of the control objects is performed; and instructing the drive controller to set the predetermined control gain in the control model part corresponding to each of the plurality of the predetermined control structures to the common control gain.

11. The parameter adjusting method according to claim 10, wherein:
the parameter adjusting method includes, before the determining process, performing a standard calculating process of calculating a predetermined control parameter of each of the control objects in the predetermined control structures, each of which includes the predetermined control gain, independently from the other control object based on predetermined properties of the control object; and determining a gain with a lowest value among the predetermined gains calculated in the standard calculating process for the plurality of the control objects as the common control gain in the determining process.

12. A non-statutory storage medium storing a parameter adjusting program that enables a processing device to execute processes and the processing device being electrically connected to a drive controller, in which
the drive controller includes:
a predetermined control structure that includes a feedback system having one or a plurality of controllers to which a feedback signal relevant to a motion of a control object is input, and a control model part having control models realized by modeling the feedback system and the control object, and that is configured to enable model follow-up control according to the control models which the control model part has; and a calculating part that performs a calculating process of a predetermined signal for drive control of the control object in the predetermined control structure, and the drive controller performs the drive control on a plurality of the control objects and to have a plurality of the predetermined control structures corresponding to the control objects respectively, the processes including:

a process of performing a determining process of determining a common control gain to set a predetermined control gain in the control model part of each of the plurality of predetermined control structures corresponding to the plurality of control objects to the common control gain for all the control model parts when synchronous control of the plurality of the control objects is performed; and a process of instructing the drive controller to set the predetermined control gain in the control model part corresponding to each of the plurality of the predetermined control structures to the common control gain.

* * * * *